United States Patent
Uchimura et al.

(10) Patent No.: US 10,631,668 B2
(45) Date of Patent: Apr. 28, 2020

(54) INSPECTION SYSTEM, INFORMATION COLLECTION APPARATUS, INSPECTION METHOD, INFORMATION COLLECTION METHOD, AND NON-TRANSITORY STORAGE MEDIUM

(71) Applicant: NEC CORPORATION, Tokyo (JP)

(72) Inventors: Jun Uchimura, Tokyo (JP); Hiroshi Takahashi, Kanagawa (JP); Masato Watanabe, Kanagawa (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/394,730

(22) Filed: Apr. 25, 2019

(65) Prior Publication Data

US 2019/0328157 A1    Oct. 31, 2019

(30) Foreign Application Priority Data

Apr. 27, 2018  (JP) .................................. 2018-086829

(51) Int. Cl.
*A47F 3/14*   (2006.01)
*G06K 7/14*   (2006.01)
*G06Q 10/08*  (2012.01)

(52) U.S. Cl.
CPC .............. *A47F 3/14* (2013.01); *G06K 7/1404* (2013.01); *G06Q 10/087* (2013.01)

(58) Field of Classification Search
None
See application file for complete search history.

(56) References Cited

U.S. PATENT DOCUMENTS 10,169,677 B1 *   1/2019  Ren .................... G06K 9/6212
2016/0171439 A1 * 6/2016  Ladden .............. G06Q 10/0832
                                                            705/340

FOREIGN PATENT DOCUMENTS

| JP | 10-187843 A   | 7/1998  |
|----|---------------|---------|
| JP | 2006-011931 A | 1/2006  |
| JP | 2006-202021 A | 8/2006  |
| JP | 2009-50426 A  | 3/2009  |
| JP | 2017-007815 A | 1/2017  |
| JP | 2017-88345 A  | 5/2017  |
| JP | 2018-173722 A | 11/2018 |

OTHER PUBLICATIONS

Communication dated Apr. 23, 2019, issued by the Japan Patent Office in counterpart Japanese Application No. 2018-086829.

* cited by examiner

*Primary Examiner* — Kristy A Haupt
(74) *Attorney, Agent, or Firm* — Sughrue Mion, PLLC

(57) ABSTRACT

The invention provides an inspection system having an information acquisition unit that acquires product information from a product having a loading board surface side to which the product information is attached and an output unit that outputs a collation result between an acquisition result of the product information and order information.

16 Claims, 16 Drawing Sheets

LIGHT  REFLECTED LIGHT

FIG. 9

| SERIAL NUMBER | POSITION INFORMATION | PRODUCT INFORMATION |
|---|---|---|
| 1 | (···, ···) | PRODUCT IDENTIFICATION INFORMATION : 32882509 |
| 2 | (···, ···) | |
| ⋮ | ⋮ | ⋮ |

FIG. 10

ARRIVAL INFORMATION

| PRODUCT IDENTIFICATION INFORMATION | NUMBER OF ARRIVALS | . . . . |
|---|---|---|
| 123456 | 5 | . . . . |
| 123455 | 5 | . . . . |
| ⋮ | ⋮ | ⋮ |

FIG. 11

ORDER INFORMATION

| PRODUCT IDENTIFICATION INFORMATION | NUMBER OF ORDERS | · · · · |
|---|---|---|
| 123456 | 5 | · · · · |
| 123455 | 4 | · · · · |
| ⋮ | ⋮ | ⋮ |

FIG. 16

PRODUCT SHAPE INFORMATION

| PRODUCT IDENTIFICATION INFORMATION | SHAPE |
|---|---|
| 123456 | RECTANGLE (ASPECT RATIO 5:2) |
| . . . . . . . | . . . . . . . |

INSPECTION SYSTEM, INFORMATION COLLECTION APPARATUS, INSPECTION METHOD, INFORMATION COLLECTION METHOD, AND NON-TRANSITORY STORAGE MEDIUM

This application is based on Japanese patent application No. 2018-086829, the content of which is incorporated hereinto by reference.

BACKGROUND

Technical Field

The invention relates to an inspection system, an information collection apparatus, an inspection method, an information collection method, and a program.

Related Art

In a store, when a product arrives, inspection work for checking whether there is any difference between arrival contents and order contents is performed. In the inspection work, for example, pieces of work are performed, such as inputting product identification information by reading a barcode attached to the arrived product or a package of the product with a barcode reader and inputting the number of arrivals of respective products visually checked.

Japanese Patent Application Publication No. 2017-7815 discloses a technique of collectively reading a plurality of barcode symbols three-dimensionally and in association with the products to inspect the products. Specifically, the barcode attached to each of the plurality of products loaded on a board is collectively read by the barcode reader installed above the board.

Japanese Patent Application Publication No. 2006-11931 discloses a technique of collectively reading a code of a rack and a plurality of codes of microtubes accommodated in the rack while the microtubes are accommodated in the rack.

SUMMARY

Both Japanese Patent Application Publication No. 2017-7815 and Japanese Patent Application Publication No. 2006-11931 do not disclose details of the inspection work performed when the product arrives in the store. Further, in the case of the technique disclosed in Japanese Patent Application Publication No. 2017-7815, a distance from the barcode reader to a surface to which the barcode is attached may largely vary due to a difference in the height of the product. As a result, it is difficult to collectively read the barcodes attached to the plurality of products. An object of the invention is to save labor for the inspection work performed when the product arrives in the store.

In one example embodiment, there is provided an inspection system including an information acquisition unit that acquires product information from a product having a loading board surface side to which the product information is attached, and an output unit that outputs a collation result between an acquisition result of the product information and order information.

In another example embodiment, there is provided an information collection apparatus including an information acquisition unit that acquires product information from a product having a loading board surface side to which the product information is attached, and a transmission unit that transmits the product information to an apparatus that collates between an acquisition result of the product information and order information.

In still another example embodiment, there is provided an inspection method executed by a computer, the method including acquiring product information from a product having a loading board surface side to which the product information is attached, and outputting a collation result between an acquisition result of the product information and order information.

In still another example embodiment, there is provided a program causing a computer to function as an information acquisition unit that acquires product information from a product having a loading board surface side to which the product information is attached, and an output unit that outputs a collation result between an acquisition result of the product information and order information.

According to the invention, it is possible to save labor for the inspection work performed when the product arrives in the store.

BRIEF DESCRIPTION OF THE DRAWINGS

The above and other objects, advantages and features of the present invention will be more apparent from the following description of certain preferred example embodiments taken in conjunction with the accompanying drawings, in which:

FIG. 9 is a table schematically illustrating an example of pieces of information generated by the inspection system 10 according to the example embodiment;

FIG. 10 is a table schematically illustrating an example of arrival information according to the example embodiment;

FIG. 11 is a table schematically illustrating an example of order information according to the example embodiment;

FIG. 16 is a table schematically illustrating an example of information processed by the inspection system 10 according to the example embodiment.

DETAILED DESCRIPTION

The invention will be now described herein with reference to illustrative example embodiments. Those skilled in the art will recognize that many alternative example embodiments can be accomplished using the teachings of the present invention and that the invention is not limited to the example embodiments illustrated for explanatory purposes.

First Example Embodiment

First, a scheme of an inspection system according to the example embodiment will be described. In the example embodiment, product information including product identification information is attached to each product. For example, a seal printed with the product information may be affixed to the product, or the product information may be printed on a package of the product or the like. The inspection system acquires the product information from one or each of a plurality of products loaded on a loading board. The inspection system outputs a collation result between an acquisition result of the product information and order information. With the inspection system according to the example embodiment, it is possible to save labor for the inspection work performed when the product arrives in the store.

Figure 1:
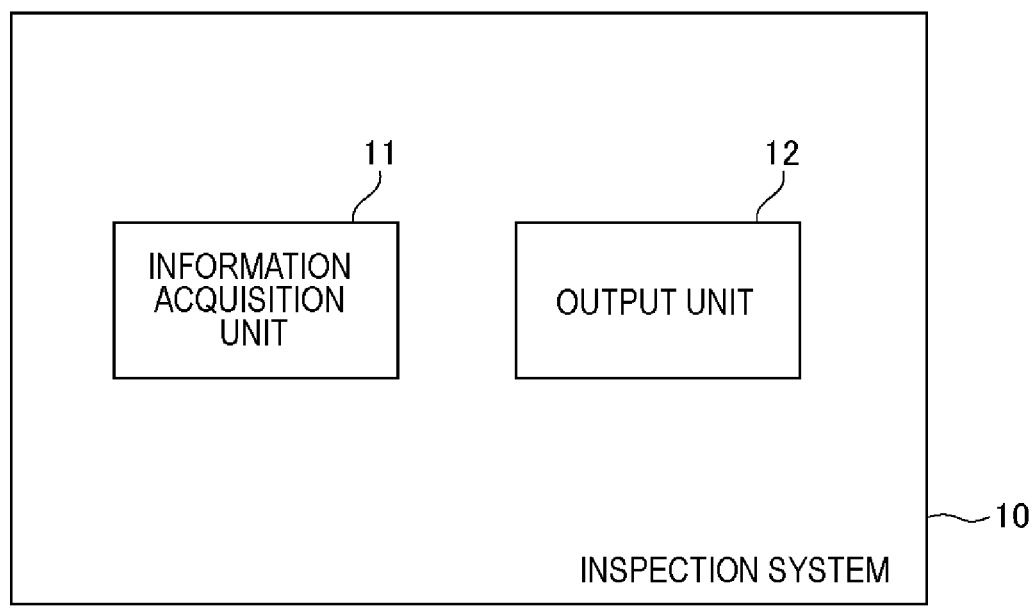
FIG. 1 is a diagram illustrating an example of a functional block diagram of an inspection system 10 according to an example embodiment.

Hereinafter, a configuration of the inspection system according to the example embodiment will be described in detail. FIG. 1 illustrates an example of a functional block diagram of an inspection system 10. As illustrated in FIG. 1, the inspection system 10 has an information acquisition unit 11 and an output unit 12. The inspection system 10 may be realized by a plurality of apparatuses divided physically and/or logically, or by one apparatus physically and/or logically.

Each functional unit included in the inspection system 10 is realized by any combination of hardware and software mainly with a central processing unit (CPU), a memory, a program loaded in the memory, a storage unit (can store a program stored in advance from a stage of shipping the apparatus, and also a program downloaded from a storage medium such as a compact disc (CD), a server on the Internet, or the like) such as a hard disk storing the program, an interface for network connection of any computer. Those skilled in the art understand that there are various modification examples in the realization method and apparatus thereof.

Figure 2:
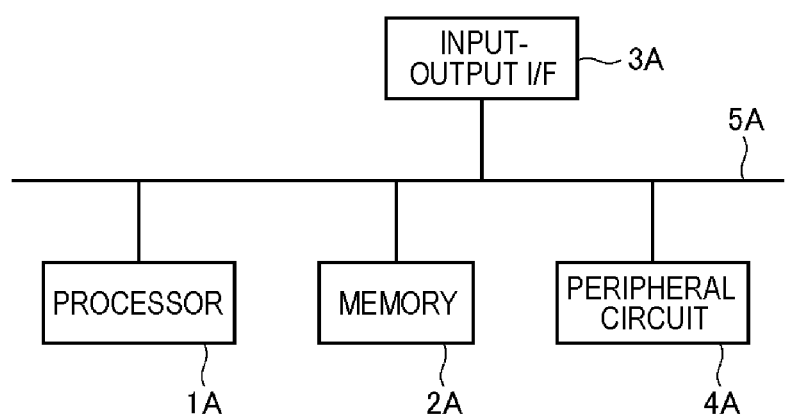
FIG. 2 is a diagram illustrating an example of a hardware configuration of an apparatus according to the example embodiment.

FIG. 2 is a block diagram illustrating a hardware configuration of the inspection system 10. As illustrated in FIG. 2, the inspection system 10 has a processor 1A, a memory 2A, an input-output interface 3A, a peripheral circuit 4A, and a bus 5A. The peripheral circuit 4A includes various modules. The peripheral circuit 4A may not be included. Note that, in a case where the inspection system 10 is realized by the plurality of apparatuses divided physically and/or logically, each apparatus can include the hardware configuration.

The bus 5A is a data transmission path for the processor 1A, the memory 2A, the peripheral circuit 4A, and the input-output interface 3A to mutually transmit and receive data. The processor 1A is, for example, a calculation processing apparatus such as the CPU or a graphics processing unit (GPU). The memory 2A is, for example, a memory such as a random access memory (RAM) or a read only memory (ROM). The input-output interface 3A includes an interface for acquiring information from an input apparatus, an external apparatus, an external server, an external sensor, or the like, an interface for outputting information to an output apparatus, the external apparatus, the external server, or the like, and the like. Examples of the input apparatus are a keyboard, a mouse, and a microphone. Examples of the output apparatus are a display, a speaker, a printer, and a mailer. The processor 1A can issue an instruction to each module and calculate on the basis of calculation results of the modules.

Return to FIG. 1, a functional configuration of each functional unit will be described. The information acquisition unit 11 acquires the product information from the product having a loading board surface side to which the product information is attached. The "product information" includes the product identification information. The product identification information may be any information that can identify the product, and examples of the product identification information are a product number, and a product name. The product information may be attached to the product in a state of being coded such as a one-dimensional code or a two-dimensional code. In addition, the product information represented by a character or the like without being coded may be attached to the product. The product information is attached to an outer surface of the product. For example, the seal printed with the product information may be affixed to the outer surface of the product, or the product information may be printed on the package of the product or the like.

A "loading board surface" is a surface where the product on the mounting board is loaded. The "product having the loading board surface side to which the product information is attached" is a product having product information that faces the loading board surface. The product to which the product information is attached is loaded on the loading board such that the product information faces the loading board surface. The product loaded on the loading board according to the rule is a product having the loading board surface side to which the product information is attached. Note that, each product may be loaded such that the product information is in contact with the loading board surface, or may be loaded so as to be a state where the product information is separated from the loading board surface.

The information acquisition unit 11 can acquire the product information attached to one or each of the plurality of products loaded on the loading board by, for example, analyzing an image generated by capturing the product from the loading board surface side. In a case where the image includes the plurality of products, the information acquisition unit 11 can acquire the product information attached to each of the plurality of products.

The output unit 12 outputs the collation result between the acquisition result of the product information and the order information. For example, a collation result between the number of arrivals of respective products determined on the basis of the acquisition result of the product information and the number of orders of respective products indicated by the order information is output. The output unit 12 can output the collation result through all kinds of output apparatuses such as the display, a projection apparatus, the speaker, and the mailer. Note that, the collation between the acquisition result of the product information and the order information may be performed by the inspection system 10 or another apparatus configured to be communicable with the inspection system 10.

Figure 3:
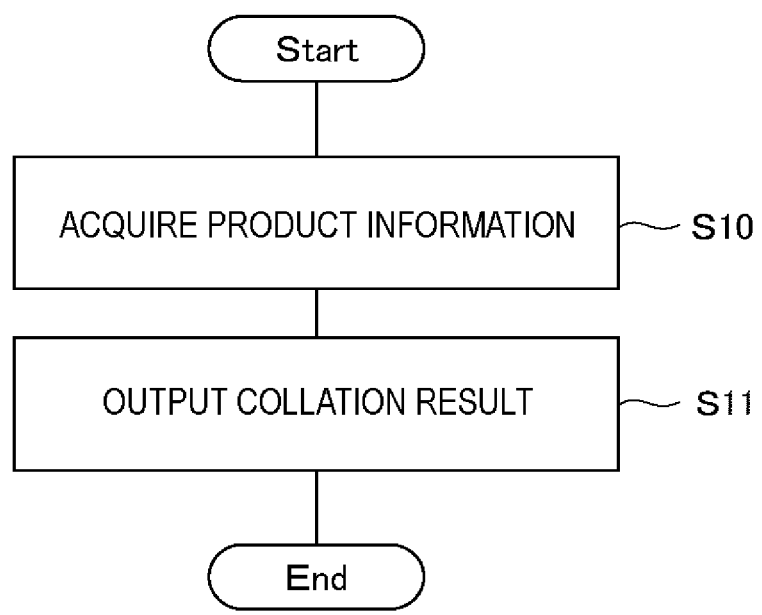
FIG. 3 is a flowchart illustrating an example of a flow of a process of the inspection system 10 according to the example embodiment.

Next, an example of a flow of a process of the inspection system 10 according to the example embodiment will be described with reference to a flowchart in FIG. 3.

In S10, the information acquisition unit 11 acquires the product information from the product having the loading board surface side to which the product information is attached. In S11, the output unit 12 outputs the collation result between the acquisition result of the product information and the order information.

With the inspection system according to the example embodiment described above, it is possible to acquire the product information from the product having the loading board surface side to which the product information is attached and to output the collation result between the acquisition result of the product information and the order information. With the inspection system according to the example embodiment, it is possible to save labor for the inspection work performed when the product arrives in the store.

Second Example Embodiment

An inspection system 10 according to the example embodiment performs the same process as the inspection system 10 according to the first example embodiment. However, hereinafter process contents will be described more specifically.

Figure 4:
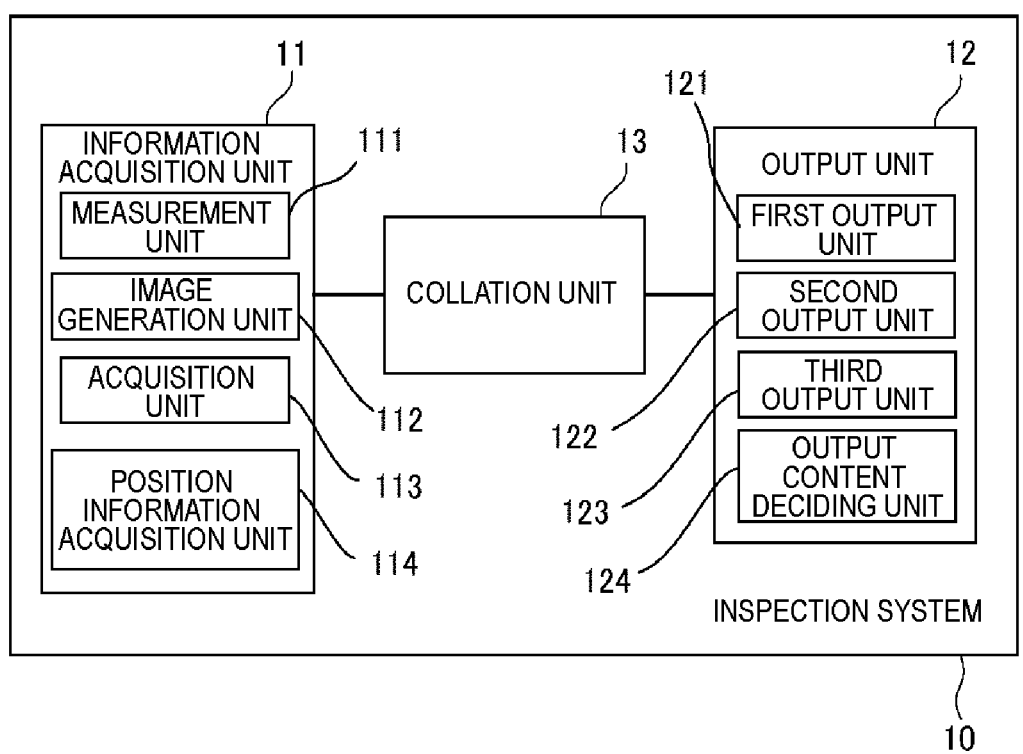
FIG. 4 is a diagram illustrating an example of a functional block diagram of an inspection system 10 according to an example embodiment.

FIG. 4 illustrates an example of a functional block diagram of the inspection system 10. As illustrated in FIG. 4, the inspection system 10 has the information acquisition unit 11, the output unit 12, and a collation unit 13. The information acquisition unit 11 has a measurement unit 111, an image generation unit 112, an acquisition unit 113, and a position information acquisition unit 114. Further, the output unit 12 has a first output unit 121, a second output unit 122, a third output unit 123, and an output content deciding unit 124. Note that, the output unit 12 may not have at least one of the first output unit 121, the second output unit 122, and the third output unit 123. The inspection system 10 may be realized by the plurality of apparatuses divided physically and/or logically, or by one apparatus physically and/or logically.

Figure 5:
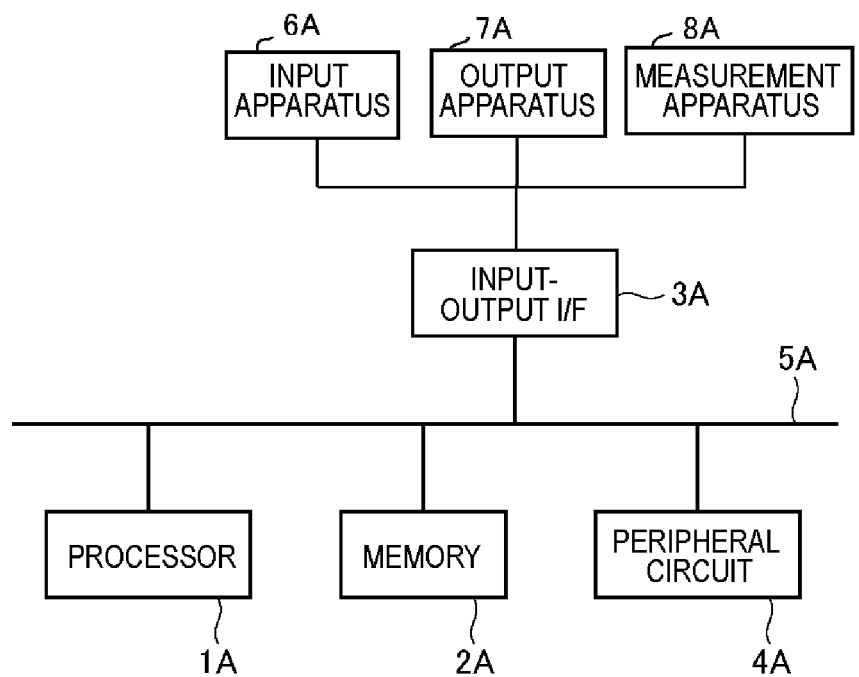
FIG. 5 is a diagram illustrating an example of a hardware configuration of an apparatus according to the example embodiment.

FIG. 5 is a block diagram illustrating a hardware configuration of the inspection system 10. As illustrated in FIG. 5, the inspection system 10 has the processor 1A, the memory 2A, the input-output interface 3A, the peripheral circuit 4A, the bus 5A, an input apparatus 6A, an output apparatus 7A, and a measurement apparatus 8A. The peripheral circuit 4A includes various modules. The peripheral circuit 4A may not be included. Note that, in the case where the inspection system 10 is realized by the plurality of apparatuses divided physically and/or logically, each apparatus can include the hardware configuration.

The processor 1A, the memory 2A, the input-output interface 3A, the peripheral circuit 4A, the bus 5A, the input apparatus 6A, and the output apparatus 7A are as described in the first example embodiment.

The measurement apparatus 8A radiates light and receives reflected light to measure a time from light emission to light reception, light reception intensity, or the like. An example as such a measurement apparatus 8A is a LIDAR that radiates laser light and receives the reflected light of the laser. Data input from the measurement apparatus 8A is stored in the memory 2A. The processor 1A can generate an image using the data input from the measurement apparatus 8A and analyze the image by executing a predetermined program. The generated image is an intensity image indicating the light reception intensity, a distance image indicating a distance to an object, and the like. Further, the processor 1A can output the calculation result by controlling the output apparatus connected through an input-output I/F 3A.

Return to FIG. 4, a functional configuration of each functional unit will be described. The information acquisition unit 11 acquires the product information indicated by the code from the product to which the code is attached on the loading board surface side. The acquisition of the product information is realized by the measurement unit 111, the image generation unit 112, the acquisition unit 113, and the position information acquisition unit 114 illustrated in FIG. 4.

In the example embodiment, the code indicating the product information is attached to each product. The product information may further include old-and-new-discrimination information which is information for discriminating between a newly arrived product and a previously arrived product in addition to the product identification information. Examples of the old-and-new-discrimination information are, for example, an arrival date, an arrival number and an order number attached for each arrival process, and a serial number attached for each product. The code in the example embodiment is the two-dimensional code but may be the one-dimensional code or other codes.

Figure 6:
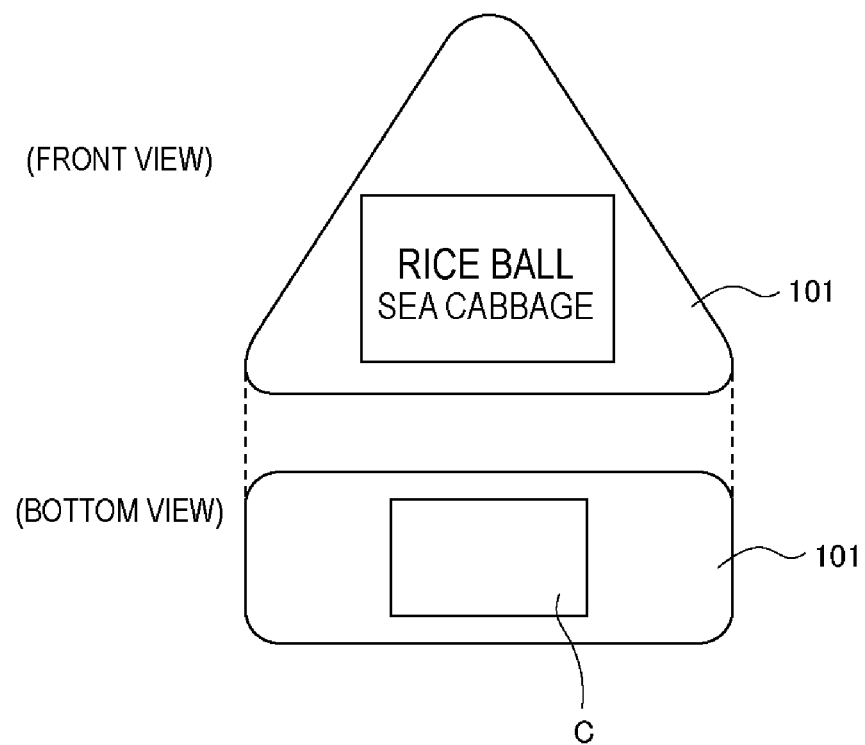
FIG. 6 is a diagram schematically illustrating an example of a product 101 to which a code C is attached.

FIG. 6 indicates an example of a product 101 to which a code C is attached. In the illustrated example, a seal on which the code C is printed is affixed to the product 101. The illustrated product 101 is a rice ball, and the code C is attached to the bottom surface thereof. Note that, a position to which the code C is attached is not limited to the bottom surface and may be other portions.

Figure 7:
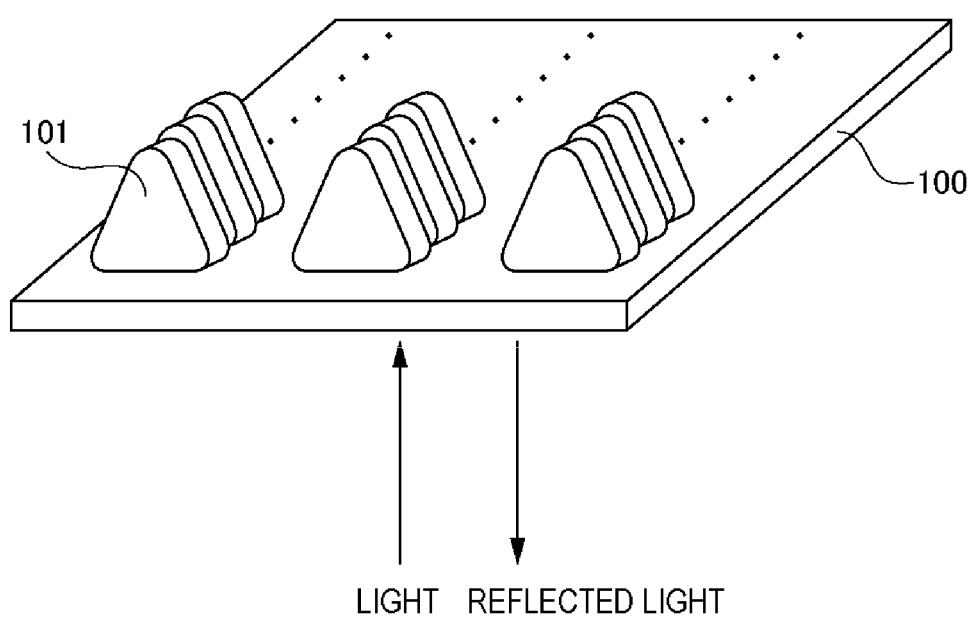
FIG. 7 is a diagram illustrating an example of the products 101 loaded on a loading board.

The loading board in the example embodiment is a display shelving unit for the product 101. The product 101 is displayed on a shelf plate 100 of the display shelving unit as illustrated in FIG. 7. The product 101 is displayed such that the code C faces a loading surface of the shelf plate 100. The product loaded on the loading board according to the rule is a product to which the code C is attached on the loading board surface side. The portion to which the code C of the product 101 is attached may be in contact with the loading board surface or may be separated from the loading board surface.

The measurement unit 111 radiates the light, for example, the laser toward the product 101 loaded on the loading board surface and receives the reflected light to measure the time from the light emission to the light reception, the light reception intensity, or the like. The measurement unit 111 is, for example, the LIDAR.

The measurement unit 111 radiates the light from the side of the surface on the side opposite to the loading board surface as illustrated in FIG. 7 and receives the reflected light to measure the time from the light emission to the light reception, the light reception intensity, or the like. The shelf plate 100 is configured to transmit the light radiated from at least one surface side. Specifically, the shelf plate 100 is configured to transmit the light radiated from the side of the surface on the side opposite to the loading board surface. Therefore, the light radiated from the side of the surface on the side opposite to the loading board surface transmits the shelf plate 100 and reaches the product 101 loaded on the loading board surface as illustrated in FIG. 7. Note that, the shelf plate 100 may be configured to transmit the light radiated from the loading board surface side, or may be configured to reflect the light radiated from the loading board surface side.

Figure 8:
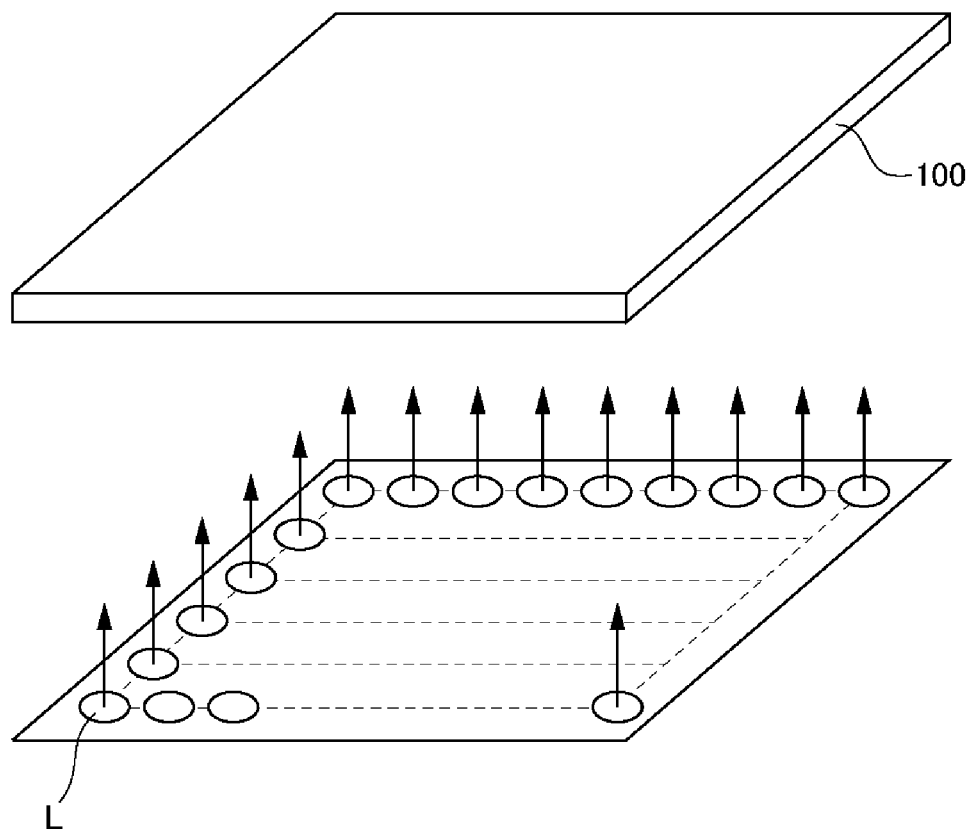
FIG. 8 is a diagram schematically illustrating an example of a light emission apparatus.

For example, as illustrated in FIG. 8, a light emission apparatus in which light sources L are arranged two-dimensionally may be disposed parallel to the shelf plate 100, and the light may be radiated from the light emission apparatus toward the shelf plate 100. With this configuration, it is possible to collect data in a desired measurement range without changing a radiation direction of the light. In a case where the data in a predetermined range is collected while changing the radiation direction of the light, an interval of a measured point group increases as a distance from the light source L increases. Consequently, the accuracy of measurement data deteriorates. When the configuration as illustrated in FIG. 8 is employed, the interval of the measured point group depends on an interval between the light sources L and is no longer depend on the distance from the light source L. As a result, it is possible to collect the measurement data with high accuracy by sufficiently reducing the interval between the light sources L. Note that, it is also possible to employ a configuration in which the measurement is performed while changing the radiation direction of the light even though the accuracy of the measurement data deteriorates.

The image generation unit 112 generates an image on the basis of the measurement data generated by the measurement unit 111. The measurement data indicates the time from the light emission to the light reception, the light reception intensity, or the like. The image generation unit 112 generates the intensity image indicating the light reception intensity, the distance image indicating the distance to the object, and the like on the basis of the measurement data. The intensity image may be, for example, an image in which a value of the light reception intensity is normalized to values having a plurality of stages to display in grayscale.

As described above, the shelf plate 100 is configured to transmit the light radiated from the side of the surface on the side opposite to the loading board surface. The product 101 is loaded such that the code C faces the loading board surface. Therefore, the generated image includes a surface to which the code C of each product 101 is attached. The intensity image displays a pattern of the code C.

The acquisition unit 113 analyzes the generated image to acquire the product information of each product 101. The acquisition unit 113 performs a process of detecting the product 101 in the image, a process of detecting the code C in the image, and a process of acquiring the product information by analyzing the pattern of the code C.

First, the acquisition unit 113 performs the process of detecting the product 101 in the image. The image analyzed in the process may be the intensity image or the distance image. For example, the acquisition unit 113 performs outline extraction processing, processing of extracting an outline satisfying a shape condition and a size condition among the extracted outlines, or the like with respect to the image to detect one or the plurality of products 101 included in the image.

The shape condition and the size condition can be set for each display area. The product 101 displayed in each display area is determined in advance. Therefore, it is possible to set the shape and the size of the product displayed in each display area as the conditions for each display area. It is possible to detect a predetermined product 101 on the image with high accuracy by setting the shape and size conditions.

After the product 101 in the image is detected, the acquisition unit 113 performs the process of detecting the code C in the image and the process of acquiring the product information by analyzing the pattern of the code C. The image analyzed in the process is the intensity image. For example, the acquisition unit 113 detects the code C from a region in the image where the product 101 is present using a pattern matching technique or the like. Thereafter, the acquisition unit 113 analyzes the pattern of the detected code C and converts the pattern thereof into information to acquire the product information of each product 101 indicated by the code C.

The position information acquisition unit 114 acquires position information indicating a position of each product 101 detected by the acquisition unit 113. The position information is coordinates in a two-dimensional coordinate system with a predetermined point in the image as the origin and with predetermined directions as the x-axis and the y-axis, and indicates the position of each product 101. For example, coordinates of a representative point in the region in the image where each product 101 is present can be used as the position information of each product 101.

An image analysis result as illustrated in FIG. 9 is generated by the process by the information acquisition unit 11. In the image analysis result, the position information of one or each of the plurality of products 101 detected in the process of detecting the product 101 is associated with the product information acquired from each product 101. Note that, for the product 101 which is detected as the product 101 in the image but the product information cannot be acquired due to various reasons such as failure to detect the code C and inability to convert the pattern of the code C into the information, only the position information is registered and the product information is not registered.

The collation unit 13 collates between the acquisition result of the product information and the order information. For example, the collation unit 13 generates arrival information indicating the arrived product 101 and the number of arrivals of respective arrived products 101 on the basis of a reading result of the product information. FIG. 10 schematically illustrates an example of the arrival information. In the arrival information, the product identification information is associated with the number of arrivals.

The collation unit 13 groups a plurality of pieces of product information acquired by the information acquisition unit 11 by collecting the plurality of pieces of product information having the same product identification information. The collation unit 13 can compute the number of pieces of product information of each group associated with each of the pieces of product identification information, as the number of arrivals of product to be indicated by each of the pieces of product identification information.

Note that, in a case where not only the newly arrived product 101 but also the previously arrived product 101 are displayed on the shelf plate 100, the product information acquired by the information acquisition unit 11 includes not only the product information acquired from the newly arrived product 101 but also the product information acquired from the previously arrived product 101. When the product is counted without distinguishing between the newly arrived product and the previously arrived product, erroneous arrival information is generated.

The collation unit 13 discriminates between the product information acquired from the newly arrived product 101 and the product information acquired from the previously arrived product 101 on the basis of the old-and-new-discrimination information included in the product information. The collation unit 13 can compute the number of arrivals of respective products by performing the grouping described above and the counting of the number of products with only the product information acquired from the newly arrived product 101 among the plurality of pieces of product information acquired by the information acquisition unit 11 as a processing target.

For example, in a case where the old-and-new-discrimination information is the serial number attached for each product 101, the collation unit 13 stores the serial number included in the product information acquired at the time of the previous arrival. The collation unit 13 can use the product information not including the stored serial number as the product information acquired from the newly arrived product 101, and can use the product information including the stored serial number as the product information acquired from the previously arrived product 101.

Further, in a case where the old-and-new-discrimination information is the arrival date, the collation unit 13 can use the product information including the arrival date of the new arrival as the product information acquired from the newly arrived product 101, and can use the product information including another arrival date and not including the arrival date of the new arrival as the product information acquired from the previously arrived product 101.

Further, in a case where the old-and-new-discrimination information is the arrival number, the collation unit 13 can use the product information including the arrival number of the new arrival as the product information acquired from the newly arrived product 101, and can use the product information including another arrival number and not including the arrival number of the new arrival as the product information acquired from the previously arrived product 101.

Further, in a case where the old-and-new-discrimination information is the order number, the collation unit 13 can use the product information including the order number relating to the new arrival as the product information acquired from the newly arrived product 101, and can use the product information including another order number and not including the order number relating to the new arrival as the product information acquired from the previously arrived product 101.

After the arrival information as illustrated in FIG. 10 is generated, the collation unit 13 collates between the arrival information and the order information stored in advance as illustrated in FIG. 11. Specifically, the collation unit 13 decides whether the number of arrivals and the number of orders match for each of the pieces of product identification information. The collation unit 13 generates the collation result as to whether the number of arrivals and the number of orders match for each of the pieces of product identification information. In a case where the number of arrivals and the number of orders do not match, the collation unit 13 may compute which of the number of arrivals and the number of orders is larger and how many more to generate a collation result further including the computing result. Note that, the order information may be stored in a storage apparatus of the inspection system 10, or in the storage apparatus of the external apparatus configured to be communicable with the inspection system 10.

Here, it is assumed that the arrival information indicating the number of arrivals of each of a plurality of pieces of product identification information as illustrated in FIG. 10 is generated, but the arrival information may not be generated. In this case, the collation unit 13 can, for example, group the plurality of pieces of product information acquired by the information acquisition unit 11 by collecting the plurality of pieces of product information having the same product identification information, count the number of pieces of product information for each group, collate between the number of counts of each group corresponding to each of the pieces of product identification information and the number of orders corresponding to each of the pieces of product identification information indicated by the order information, and generate the collation result.

Return to FIG. 4, the output unit 12 outputs the collation result obtained by the collation unit 13. The output unit 12 executes at least one of a first output method to a third output method described below. The first output method is realized by a first output unit 131. The second output method is realized by a second output unit 132. The third output method is realized by a third output unit 133. An output content deciding unit 134 decides the contents to be output on the basis of a deciding result of the collation unit 13. The first output unit 131, the second output unit 132, and the third output unit 133 output pieces of information indicating the contents decided by the output content deciding unit 134.

In the first output method, the first output unit 131 displays the information indicating the collation result on the shelf plate 100 by using the projection apparatus. In this case, the shelf plate 100 has semi-transmittance that reflects the light radiated from the loading board surface side and transmits the light radiated from the side of the surface on the side opposite to the loading board surface. The configuration can be realized by, for example, using a technique such as a display that transmits a backlight and reflects external light. The projection apparatus radiates the light from the loading board surface side.

The first output unit 131 can display information that can discriminate the product 101 for which the number of acquisitions of the product information and the number of orders indicated by the order information do not match. Further, the first output unit 131 can display information that can discriminate at least one of the product whose product information can be acquired and the product whose product information cannot be acquired. Further, the first output unit 131 can display information that can discriminate the product 101 for which the number of arrivals and the number of orders do not match. Further, the first output unit 131 can display information indicating which of the number of arrivals and the number of orders is larger and how many more. Further, the first output unit 131 can display information that can discriminate the product 101 for which the number of arrivals and the number of orders match. Further the first output unit 131 can display information that can discriminate the product 101 which can be detected as the product 101 in the image but the product information cannot be acquired due to various reasons such as failure to detect the code C and inability to convert the pattern of the code C into the information. Further, the output unit 12 can display information that can discriminate between the newly arrived product 101 and the previously arrived product 101.

Figure 12:
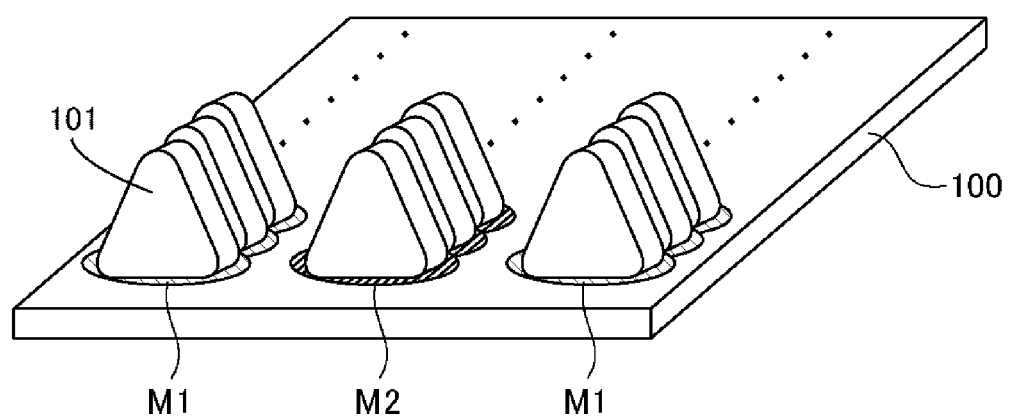
FIG. 12 is a diagram schematically illustrating an example of pieces of information output by the inspection system 10 according to the example embodiment.

FIG. 12 illustrates an example. In the example illustrated in FIG. 12, the first output unit 131 radiates the light to the shelf plate 100 and displays a mark M1 which is the information that can discriminate the product 101 for which the number of arrivals and the number of orders match at a loading position of the product 101. Further, the output unit 12 radiates the light to the shelf plate 100 and displays a mark M2 which is the information that can discriminate the product 101 for which the number of arrivals and the number of orders do not match at a loading position of the product 101. The output unit 12 does not display any information at a loading position of the product 101 whose product information cannot be acquired due to various reasons such as failure to detect the product, failure to detect the code C, and inability to convert the pattern of the code C into the information. The mark M1 and the mark M2 have different display forms such as color, shape, shading, and the like.

Note that, the information indicating which of the number of arrivals and the number of orders is larger and how many more may be displayed near the mark M2. For example, a plus value such as "+2" may be displayed in a case where the number of arrivals is larger than the number of orders, and a minus value such as "−2" may be displayed in a case where the number of arrivals is smaller than the number of orders.

Note that, the information to be displayed may be other pieces of information such as character, number, and symbol. Further, the information is displayed so as to encompass the loading position of the product 101 in the illustrated example, but the information may be displayed near the loading position.

The output content deciding unit 134 decides the mark to be displayed at the loading position of each product 101 on the basis of the position information indicating the loading position of each product 101 acquired by the position information acquisition unit 114 and the collation result of each product 101 generated by the collation unit 13. For example, the output content deciding unit 134 may decide that the mark M1 is displayed at the loading position of the product 101 for which the number of arrivals and the number of orders match, the mark M2 is displayed at the loading position of the product 101 for which the number of arrivals and the number of orders do not match, and nothing is displayed at the loading position of the product 101 whose product information cannot be acquired.

Further, the output content deciding unit 134 can convert the loading position of each product 101 indicated by the coordinate system of the image into coordinates in the coordinate system of the projection region of the projection apparatus on the basis of a conversion rule generated in advance which converts the "coordinates in the coordinate system of the image" into the "coordinates in the coordinate system of the projection region of the projection apparatus". The coordinate system of the projection region of the projection apparatus is a coordinate system with a predetermined point in the projection region as the origin and with predetermined directions as the x-axis and the y-axis.

According to the first output method, a store staff can intuitively judge whether the number of arrivals and the number of orders of each product 101 displayed on the shelf plate 100 match, which of the number of arrivals and the number of orders is larger and how many more in the case where the number of arrivals and the number of orders do not match, and the like on the basis of display contents on the shelf plate 100, that is, display/non-display of the mark at the loading position of each product 101 and contents of the mark.

In the second output method, the second output unit 132 transmits the collation result to a predetermined another apparatus. The other apparatus is an apparatus operated by the store staff, and an example of the other apparatus is a point-of-sales (POS) register, a tablet terminal, a smartphone, or a mobile phone.

The output content deciding unit 134 can decide the product name of the product 101 for which the number of arrivals and the number of orders do not match, the information indicating which of the number of arrivals and the number of orders is larger and how many more as the collation result to be transmitted to the other apparatus. The output content deciding unit 134 may include information indicating a display position of the product 101 for which the number of arrivals and the number of orders do not match in the collation result to be transmitted to the other apparatus.

In a case where the information indicating the display position of the product 101 for which the number of arrivals and the number of orders do not match is included in the collation result to be transmitted to the other apparatus, the collation unit 13 can include the information indicating the display position of the product 101 for which the number of arrivals and the number of orders do not match in the collation result to be output. In the example embodiment, the measurement apparatus 8A is installed for each display area, and the measurement data in each display area is acquired by each measurement apparatus 8A. The collation unit 13 can determine that the product information of the product 101 for which the number of arrivals and the number of orders do not match is acquired on the basis of the measurement data acquired by which measurement apparatus 8A and can include information indicating a display area corresponding to the determined measurement apparatus 8A in the collation result. In addition, display information indicating the display area of each product 101 may be generated. The collation unit 13 may identify the display position of the product 101 for which the number of arrivals and the number of orders do not match with reference to the display information.

According to the second output method, the store staff can recognize the presence of the product 101 for which the number of arrivals and the number of orders do not match, the product name of the product 101, which of the number of arrivals and the number of orders is larger and how many more, the display position of the product 101, and the like on the basis of the information displayed on the POS register, the tablet terminal, the smartphone, the mobile phone, or the like or information output by a sound. The store staff can collect the product 101, communicate with a consignor, or the like.

In the third output method, the third output unit 123 outputs the collation result through the output apparatus such as the display, the speaker, a printer, or the like included in the inspection system 10. The output content deciding unit 134 can decide the product name of the product 101 for which the number of arrivals and the number of orders do not match and the information indicating which of the number of arrivals and the number of orders is larger and how many more as the collation result output through the output apparatus. The output content deciding unit 134 may include the information indicating the display position of the product 101 for which the number of arrivals and the number of orders do not match in the collation result output through the output apparatus.

The inspection system 10 may be realized by the plurality of apparatuses divided physically and/or logically. The plurality of apparatuses are, for example, a first apparatus installed in a sales area of the store and a second apparatus installed in the backyard of the store. In this case, the second apparatus can have the output apparatus such as the display, the speaker, the printer, or the like. The third output unit 123 can output the collation result described above through the output apparatus.

According to the third output method, the store staff can recognize the presence of the product 101 for which the number of arrivals and the number of orders do not match, the product name of the product 101, which of the number of arrivals and the number of orders is larger and how many more, the display position of the product 101, and the like on the basis of the information output from the display, the speaker, the printer, or the like included in the inspection system 10. The store staff can collect the product 101, communicate with a consignor, or the like.

Figure 13:
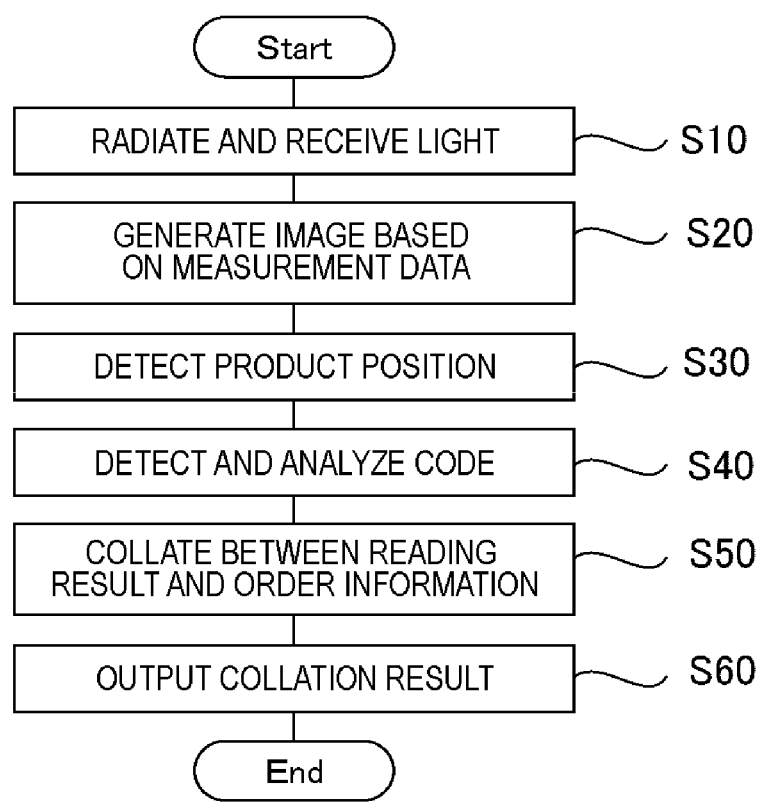
FIG. 13 is a flowchart illustrating an example of a flow of a process of the inspection system 10 according to the example embodiment.

Next, an example of a flow of a process of the inspection system 10 according to the example embodiment will be described using a flowchart in FIG. 13.

For example, the process of the illustrated flowchart is started in response to a user input for starting the process. After displaying the newly arrived product 101 in a predetermined display area such that the code C faces the loading board surface as illustrated in FIG. 7, the store staff performs the user input described above.

Here, an example of a method of the user input will be described. For example, the input apparatus may be installed on the display shelving unit. Examples of the input apparatus are a physical button, a touch panel display, and the microphone. The user input described above may be performed by an operation with respect to the input apparatus. Note that, the input apparatus may be installed for each display area.

The minimum unit of the display area may be the unit of a shelf plate 100, may be the unit of a small area in which the shelf plate 100 is divided into a plurality of small areas, may be the unit of a display shelving unit having a plurality of shelf plates 100, or may be other units.

In addition, the user input described above may be performed by the operation with respect to the POS register, the tablet terminal, the smartphone, the mobile phone, the apparatus installed in the backyard of the store, or the like. That is, the user input described above may be performed remotely. In this case, the store staff may be able to specify one or a plurality of display areas where the process is executed.

Note that, the apparatus for performing the user input is configured to be communicable with the inspection system 10 wiredly and/or wirelessly.

In S10, the measurement unit 111 radiates the light, for example, the laser toward the loading board and receives the reflected light to measure the time from the light emission to the light reception, the light reception intensity, or the like. In S20, the image generation unit 112 generates an image on the basis of the measurement data in S20. The image generation unit 112 generates the intensity image indicating the light reception intensity, the distance image indicating the distance to the object, and the like.

In S30, the acquisition unit 113 analyzes the image generated in S20 to detect the product 101 included in the image. In a case where the plurality of products 101 are present in the image, each of the plurality of products is detected. For example, the acquisition unit 113 performs the outline extraction processing, the process of extracting the outline satisfying the shape condition and the size condition among the extracted outlines, or the like to detect one or the plurality of products 101 included in the image. Thereafter, the position information acquisition unit 114 acquires the position information indicating the loading position of the product 101 detected by the acquisition unit 113. The position information is the coordinates in the two-dimensional coordinate system with a predetermined point in the image as the origin and with predetermined directions as the x-axis and the y-axis, and indicates the position of each product 101. For example, the coordinates of the representative point in the region in the image where each product 101 is present can be used as the position information of each product 101. The position information acquisition unit 114 stores the computed position information of each product 101 in the storage apparatus as the image analysis result as illustrated in FIG. 9. Note that, the position information acquisition unit 114 may store the information indicating the region in the image where each product 101 is present in the storage apparatus in association with the position information of each product 101.

In S40, the acquisition unit 113 analyzes the image generated in S20 to detect the code C in the image. For example, the acquisition unit 113 detects the code C from the region in the image where the product 101 is present using the pattern matching technique or the like. Thereafter, the acquisition unit 113 analyzes the pattern of the detected code C and converts the pattern thereof into information to acquire the product information of each product 101 indicated by the code C. In a case where a plurality of codes C are present in the image, the acquisition unit 113 detects the plurality of codes, analyzes each code to convert into the product information. The acquisition unit 113 can register the product information indicated by the code C detected from the region in the image where each product 101 is present in association with the position information of each product 101 registered in S30 as illustrated in FIG. 9. Note that, for the product 101 which is detected as the product 101 in the image but the product information cannot be acquired due to various reasons such as failure to detect the code C and inability to convert the pattern of the code C into the information, only the position information is registered and the product information is not registered.

In S50, the collation unit 13 collates between the acquisition result of the product information and the order information. For example, the collation unit 13 discriminates between the product information acquired from the newly arrived product 101 and the product information acquired from the previously arrived product 101 on the basis of the old-and-new-discrimination information included in the product information. The collation unit 13 groups the plurality of pieces of product information by collecting the plurality of pieces of product information having the same product identification information, with only the product information acquired from the newly arrived product 101 among the plurality of pieces of product information acquired by the information acquisition unit 11 as the processing target. Next, the collation unit 13 computes the number of pieces of product information of each group associated with each of the pieces of product identification information as the number of arrivals of product indicated by each of the pieces of product identification information. As a result, the arrival information as illustrated in FIG. 10 is generated.

Thereafter, the collation unit 13 performs the collation on the basis of the generated arrival information and the order information stored in advance as illustrated in FIG. 11. Specifically, the collation unit 13 collates between the number of arrivals and the number of orders for each of the pieces of product identification information to generate the collation result indicating whether the number of arrivals and the number of orders match. Note that, in the case where the number of arrivals and the number of orders do not match, the collation unit 13 may compute which of the number of arrivals and the number of orders is larger and how many more to generate a collation result further including the computing result.

In S60, the output unit 12 outputs the collation result generated in S50. The output unit 12 executed at least one of the first output method to the third output method described above.

Figure 14:
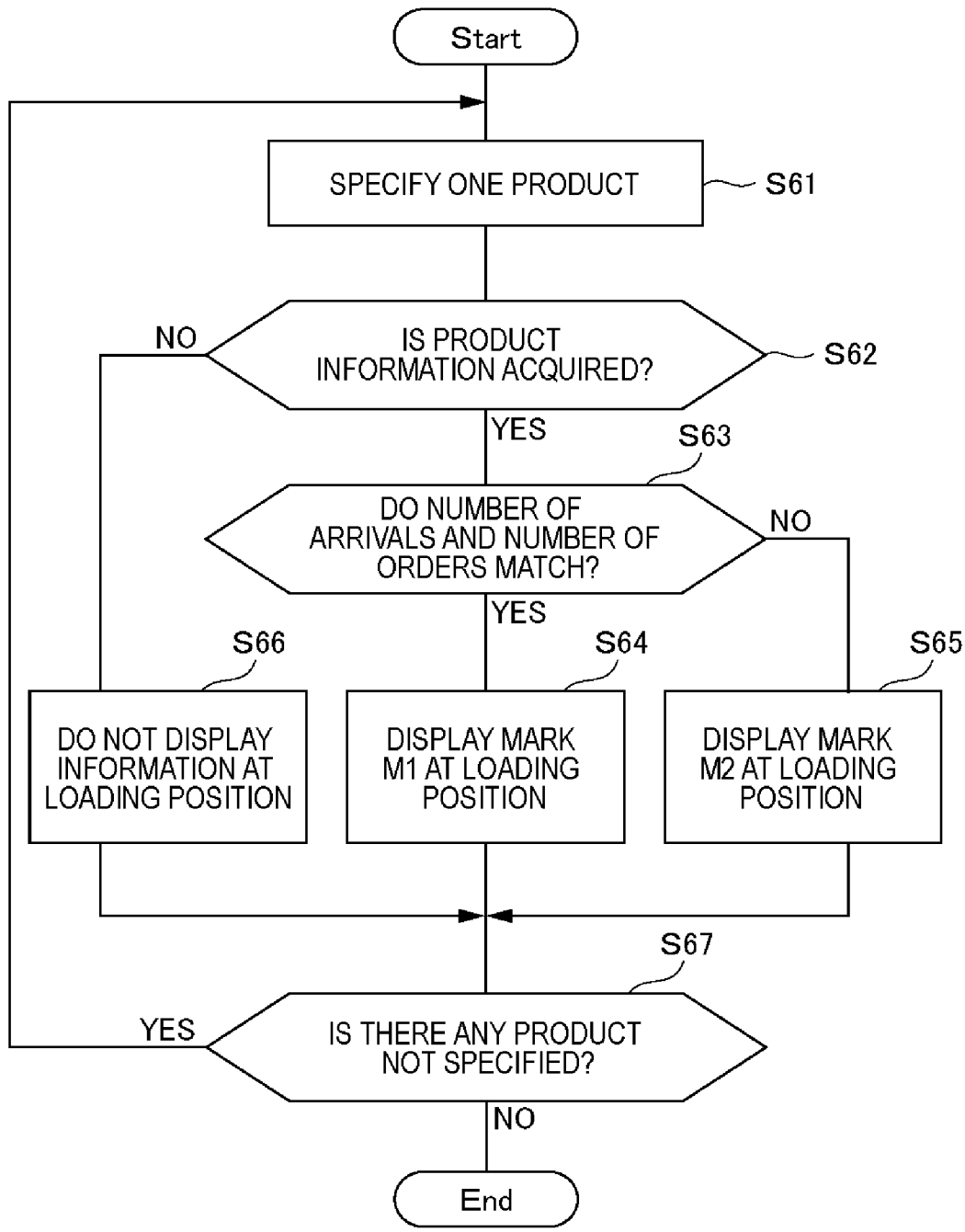
FIG. 14 is a flowchart illustrating an example of a flow of a process of the inspection system 10 according to the example embodiment.

Here, an example of a flow of a process of deciding the contents to be output by the output content deciding unit 134 in the first output method will be described using a flowchart in FIG. 14. Note that, the above is only an example, and the invention is not limited thereto.

The output content deciding unit 134 specifies one of the products detected in S30 (S61). For example, the output content deciding unit 134 specifies one serial number in which the position information is registered in the image analysis result illustrated in FIG. 9.

In a case where the product information of the specified product is acquired in S40 (Yes in S62), that is, in a case where the product information is registered in association with the specified serial number, the output content deciding unit 134 proceeds to S63. In a case where the collation result in S50 is "the number of arrivals and the number of orders match" (Yes in S63), the output content deciding unit 134 decides to display the mark M1 at the loading position of the product (S64).

On the other hand, in a case where the collation result in S50 is "the number of arrivals and the number of orders do not match" (No in S63), the output content deciding unit 134 decides to display the mark M2 at the loading position of the product (S65).

Further, in a case where the product information of the specified product is not acquired (No in S62), that is, in a case where the product information is not registered in association with the specified serial number, the output content deciding unit 134 decides to not display information at the loading position of the product (S66).

The mark M1 and the mark M2 have different display forms such as color, shape, shading, and the like and thus can be discriminated from each other.

In S67, the output content deciding unit 134 checks whether there is any product not specified in S61 among the products whose positions are detected in S30. For example, the output content deciding unit 134 checks whether there is any serial number not specified in S61 among the serial numbers in which the position information is registered in the image analysis result illustrated in FIG. 9. In a case where there is any product not specified in S61 (Yes in S67), the output content deciding unit 134 returns to S61 to repeat the process. In a case where there is no product not specified in S61 (No in S67), the output content deciding unit 134 ends the process.

The inspection system 10 according to the example embodiment described above can acquire each of the pieces of product information from each product 101 displayed on the display shelving unit, collate the number of arrivals and the number of orders on the basis of the acquired product information, and output the collation result.

With the inspection system 10 according to the example embodiment, the store staff can avoid the troublesome inspection work such as inputting the product information by reading the barcode attached to the arrived product 101 or the package of the product with the barcode reader and inputting the number of arrivals of respective products 101 visually checked. As a result, it is possible to save labor for the inspection work performed when the product 101 arrives.

Further, the inspection system 10 according to the example embodiment acquires the product information from the product 101 displayed on the display shelving unit to generate the arrival information. In this case, when the newly arrived product 101 cannot be discriminated from the previously arrived product 101, there is a problem that erroneous arrival information is generated. However, the inspection system 10 according to the example embodiment can discriminate between the newly arrived product 101 and the previously arrived product 101 on the basis of the old-and-new-discrimination information acquired from each product 101.

Therefore, it is possible to correctly generate the arrival information.

Further, with the inspection system 10 according to the example embodiment, since the product information is acquired by the image analysis, it is possible to collectively process the plurality of products 101 included in the image. Therefore, work efficiency improves.

Further, the inspection system 10 according to the example embodiment acquires the product information from the product 101 having the loading board surface side to which the product information is attached. Specifically, the measurement apparatus 8A radiates the light from the side of the surface on the side opposite to the loading board surface toward the product 101 having the loading board surface side to which the product information is attached as illustrated in FIG. 7 and receives the reflected light to measure the time from the light emission to the light reception, the light reception intensity, or the like.

In a case where the plurality of products 101 are loaded such that the product information faces the loading board surface, the position of each of the pieces of product information of the plurality of products 101 gathers near the loading board surface without being affected by variation in the height of the product 101 or the like. In a case where the plurality of products 101 are loaded such that the product information is in contact with the loading board surface, the position of each of the pieces of product information of the plurality of products 101 is within a narrower range.

In such a case, a distance between the measurement apparatus 8A and the product information of each product is within a constant small range without being affected by variation in the height of the product 101 or the like. As a result, it is easy to collectively read the codes attached to the plurality of products 101.

Third Example Embodiment

An inspection system 10 according to the example embodiment differs from the first and second example embodiments in that the shape of the product 101 loaded on the loading board is determined and information indicating whether the determined shape matches with the product information acquired by the information acquisition unit 11 is output. Hereinafter, the description will be made.

The hardware configuration of the inspection system 10 is the same as the first and second example embodiments.

Figure 15:
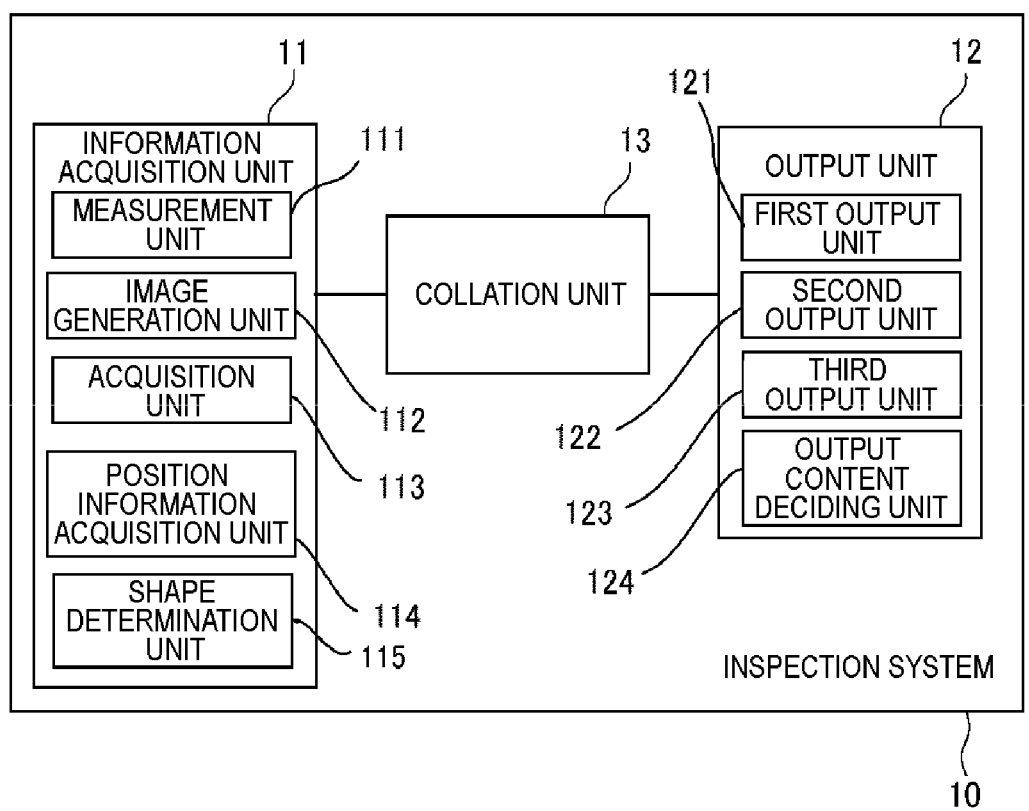
FIG. 15 is a diagram illustrating an example of a functional block diagram of an inspection system 10 according to an example embodiment.

FIG. 15 illustrates an example of a functional block diagram of the inspection system 10. As illustrated in FIG. 15, the inspection system 10 has the information acquisition unit 11, the output unit 12, and the collation unit 13. The information acquisition unit 11 has the measurement unit 111, the image generation unit 112, the acquisition unit 113, the position information acquisition unit 114, and a shape determination unit 115. Further, the output unit 12 has the first output unit 121, the second output unit 122, the third output unit 123, and the output content deciding unit 124. Note that, the output unit 12 may have at least one of the first output unit 121, the second output unit 122, and the third output unit 123. The inspection system 10 may be realized by the plurality of apparatuses divided physically and/or logically, or by one apparatus physically and/or logically.

The configurations of the measurement unit 111, the image generation unit 112, the acquisition unit 113, the position information acquisition unit 114, the first output unit 121, the second output unit 122, the third output unit 123, and the output content deciding unit 124 are the same as the second example embodiment.

The shape determination unit 115 analyzes the image generated by the image generation unit 112 to determine the shape of the product 101 included in the image. For example, the shape determination unit 115 may determine the shape of the surface facing the loading board surface of the product 101.

The collation unit 13 holds product shape information indicating the shape of each product 101 in advance as illustrated in FIG. 16. The product shape information may indicate the shape of the surface to which the product information of each product 101 is attached. When the acquisition unit 113 acquires the product information from each product 101, the collation unit 13 extracts a shape corresponding to the product identification information included in the product information from the product shape information. Next, the collation unit 13 decides whether the extracted shape matches with the shape of the product 101 determined by the shape determination unit 115.

The "match" may include completely matching and slightly different. For example, it may be decided as the matching in a case where the shape of the product 101 indicated by the product shape information is a "rectangle with aspect ratio 5:2" and in a case where the shape of the product 101 determined by the shape determination unit 115 is a rectangle with aspect ratio A:B (provided that, $5-\alpha \leq A \leq 5+\alpha$, $2-\beta \leq B \leq 2+\beta$).

The output unit 12 outputs the deciding result by the collation unit 13. That is, the output unit 12 outputs the information indicating whether the shape of the product 101 determined by the shape determination unit 115 matches with the shape of the product 101 determined on the basis of the product information acquired from each product 101.

The other configurations of the information acquisition unit 11, the output unit 12, and the collation unit 13 are the same as the first and second example embodiments.

With the inspection system 10 according to the example embodiment, the same advantageous effects as the first and second example embodiments can be realized. Further, with the inspection system 10 according to the example embodiment, it is possible to detect mismatching between the product information attached to each product 101 and each product 101. It is considered that such a mismatching occurs due to, for example, an attachment mistake in which the code C required to be attached to a first product 101 is attached to a second product 101, or the like.

Hereinafter, modification examples that can be employed in the first to third example embodiments will be described. In a first modification example, the inspection system 10 has a camera instead of the measurement apparatus 8A described above. The image including the product 101 displayed on the shelf plate 100 is generated by the camera, and the acquisition of product attribute information is realized by the analysis of the image. The camera may image the product 101 from any direction. The product 101 is displayed such that the surface to which the code C is attached faces the camera.

In a second modification example, the loading board on which the product 101 is loaded may not be the shelf plate 100 of the display shelving unit. The loading board may be installed at a predetermined position in the store, for example, in the backyard. In this case, the store staff carries the newly arrived product 101 to the position of the loading board and loads the product 101 on the loading board. The inspection system 10 performs the measurement of radiating the light with respect to the product 101 loaded on the loading board and receiving the reflected light, the imaging of the product 101 by using the camera, and the like to generate the image.

In the second modification example, the product 101 loaded on the loading board is only the newly arrived product 101, and the previously arrived product 101 is not loaded on the loading board. Therefore, the process of discriminating between the newly arrived product 101 and the previously arrived product 101 described above is unnecessary.

It is possible to realize the same advantageous effects as the example embodiments also in these modification examples.

Hereinafter, examples of reference forms will be added.

1. An inspection system including:
    an information acquisition unit that acquires product information from a product having a loading board surface side to which the product information is attached; and
    an output unit that outputs a collation result between an acquisition result of the product information and order information.
2. The inspection system according to 1,
    in which the information acquisition unit includes
        a measurement unit that radiates laser light toward the product and receives reflected light of the laser,
        an image generation unit that generates an image on the basis of measurement data generated by the measurement unit, and
        an acquisition unit that acquires the product information on the basis of the image.
3. The inspection system according to 1 or 2,
    in which the information acquisition unit includes a shape determination unit that determines a shape of the product, and
    in which the output unit outputs information indicating whether the determined shape matches with the acquired product information.
4. The inspection system according to any of 1 to 3,
    in which the loading board is a shelf plate of a display shelving unit, and
    in which the output unit displays information on the shelf plate of the display shelving unit.
5. The inspection system according to 4,
    in which the information acquisition unit includes a position information acquisition unit that acquires information indicating a loading position of the product, and
    in which the output unit displays information that can discriminate at least one of a product for which the acquisition of the product information is possible and a product for which the acquisition of the product information is impossible by radiating light to the loading board.
6. The inspection system according to 4,
    in which the information acquisition unit further includes a position information acquisition unit that acquires information indicating a loading position of the product, and
    in which the output unit displays information that can discriminate a product for which the number of acquired pieces of the product information and the number of orders indicated by the order information do not match by radiating light to the loading board.
7. The inspection system according to any of 1 to 6, further including:
    a collation unit that collates between the acquisition result of the product information and the order information.

8. An information collection apparatus including:
    an information acquisition unit that acquires product information from a product having a loading board surface side to which the product information is attached; and
    a transmission unit that transmits the product information to an apparatus that collates between an acquisition result of the product information and order information.
9. An inspection method executed by a computer, the method comprising:
    acquiring product information from a product having a loading board surface side to which the product information is attached; and
    outputting a collation result between an acquisition result of the product information and order information.
10. A program causing a computer to function as:
    an information acquisition unit that acquires product information from a product having a loading board surface side to which the product information is attached; and
    an output unit that outputs a collation result between an acquisition result of the product information and order information.

It is apparent that the present invention is not limited to the above example embodiment, and may be modified and changed without departing from the scope and spirit of the invention.

REFERENCE NUMERALS

1A: processor
2A: memory
3A: input-output I/F
4A: peripheral circuit
5A: bus
6A: input apparatus
7A: output apparatus
8A: measurement apparatus
10: inspection system
11: information acquisition unit
12: output unit
13: collation unit
100: shelf plate
101: product
111: measurement unit
112: image generation unit
113: acquisition unit
114: position information acquisition unit
131: first output unit
132: second output unit
133: third output unit
134: output content deciding unit
135: shape determination unit
C: code
L: light source
M1: mark
M2: mark

What is claimed is:
1. An inspection system comprising:
    at least one memory configured to store one or more instructions; and
    at least one processor configured to execute the one or more instructions to:
        acquire product information from a product which is loaded on a loading board such that the product information faces a loading board surface; and
        output a collation result between an acquisition result of the product information and order information.

2. The inspection system according to claim 1,
wherein the at least one processor is further configured to execute the one or more instructions to:
    radiate laser light toward the product and receive a reflected light of a laser,
    generate an image using the reflected light, and
    acquire the product information using the image.
3. The inspection system according to claim 1,
wherein the at least one processor is further configured to execute the one or more instructions to:
    determine a shape of the product, and
    output information indicating whether the determined shape matches with the acquired product information.
4. The inspection system according to claim 1,
wherein the loading board is a shelf plate of a display shelving unit, and
wherein the at least one processor is further configured to execute the one or more instructions to display information on the shelf plate of the display shelving unit.
5. The inspection system according to claim 4,
wherein the at least one processor is further configured to execute the one or more instructions to:
    acquire information indicating a loading position of the product, and
    display information that can discriminate at least one of:
        a product for which the acquisition of the product information is possible and
        a product for which the acquisition of the product information is impossible by radiating light to the loading board.
6. The inspection system according to claim 4,
wherein the at least one processor is further configured to execute the one or more instructions to:
    acquire information indicating a loading position of the product, and
    display information that can discriminate a product for which the number of acquired pieces of the product information and the number of orders indicated by the order information do not match by radiating light to the loading board.
7. The inspection system according to claim 1,
wherein the at least one processor is further configured to execute the one or more instructions to collate between
the acquisition result of the product information and
the order information.
8. The inspection system according to claim 1,
wherein the at least one processor is further configured to execute the one or more instructions to:
output a collation result between a number of arrivals of each product determined using the acquisition result of the product information and a number of orders of each product indicated by the order information.
9. The inspection system according to claim 1,
wherein the at least one processor is further configured to execute the one or more instructions to:
acquire the product information from the product that is in a state of being displayed on a product display shelving unit, which is the loading board.
10. The inspection system according to claim 1,
wherein the product is loaded on a shelf plate of a product display shelving unit, which is the loading board, and
the at least one processor is further configured to execute the one or more instructions to:

acquire the product information from the product having a shelf plate side to which the product information is attached.

11. The inspection system according to claim 1, wherein the at least one processor is further configured to execute the one or more instructions to:
acquire the product information attached to the product from the side of the loading board surface, on which the product is loaded.

12. The inspection system according to claim 1, wherein the product is loaded on a shelf plate of a product display shelving unit, which is the loading board, and the shelf plate transmits light radiated from at least one surface side.

13. The inspection system according to claim 1, wherein the at least one processor is further configured to execute the one or more instructions to:
acquire the product information attached to the product via the loading board on which the product is loaded.

14. An information collection apparatus comprising:
at least one memory configured to store one or more instructions; and
at least one processor configured to execute the one or more instructions to:
acquire product information from a product which is loaded on a loading board such that the product information faces a loading board surface; and
transmit the product information to an apparatus that collates between an acquisition result of the product information and order information.

15. An inspection method comprising:
acquiring product information from a product which is loaded on a loading board such that the product information faces a loading board surface; and
outputting a collation result between
an acquisition result of the product information and order information.

16. A non-transitory storage medium storing a program, which if executed, causes a computer to:
acquire product information from a product which is loaded on a loading board such that the product information faces a loading board surface; and
output a collation result between an acquisition result of the product information and order information.

\* \* \* \* \*